United States Patent Office 2,865,919
Patented Dec. 23, 1958

2,865,919
PRODUCTION OF HEXAMETHYLENETETRAMINE

Richard Ludwig, deceased, late of Leverkusen-Bayerwerk, by Mathilde Ludwig, executrix, Opladen, and Friedrich Halle and Karl-Heinz Legrand, Leverkusen-Bayerwerk, Germany, assignors to Farbenfabriken Bayer Aktiengesellschaft, Leverkusen, Germany, a corporation of Germany No Drawing. Application May 12, 1954
Serial No. 429,402

Claims priority, application Germany May 16, 1953

4 Claims. (Cl. 260—248.6)

This invention relates to an improvement in the production of hexamethylenetetramine and is more particularly concerned with a process for producing hexamethylenetetramine in the gaseous phase.

It is well known to produce hexamethylenetetramine by contacting ammonia with an aqueous formaldehyde solution. This liquid phase method has the disadvantage of requiring a considerable expenditure of heat since the reaction mixture must be evaporated in order to recover the product.

It is an object of the present invention to provide a commercially attractive process for the production of hexamethylenetetramine. Another object is to provide a process for preparing hexamethylenetetramine in a high yield and in a high state of purity. Still further objects will appear hereinafter.

These objects are attained in accordance with this invention by reacting gaseous formaldehyde with gaseous ammonia while introducing water or an inert gas into the reaction zone.

According to a preferred embodiment of the present invention the vapor mixture obtained in the production of formaldehyde from methanol or methane is used as the starting material in place of pure formaldehyde vapor. When obtained by oxidation of methanol this vapor mixture consists of about 18% by volume of formaldehyde, 43% by volume of water, and 38% by volume of inert gases ($N_2$, $H_2$, $CO_2$, CO etc.). If this gas mixture is reacted with the theoretical amount of ammonia in an insulated reactor, the temperature rises by about 300° C. provided that the conversion is 100%. In other words, the reaction is strongly exothermic. On the other hand, the reaction temperature must be maintained within comparatively narrow limits since at temperatures below 100° C. condensation of water takes place and at temperatures above 140° C. a slight decomposition of the hexamethylenetetramine formed begins to occur. For this reason it is necessary to abstract the heat of reaction as rapidly as possible.

To this end, water or an inert gas is introduced as a cooling medium into the reaction zone in accordance with the present invention. In order to ensure a fine distribution of the water it is preferably passed in through jets, if desired with the aid of an auxiliary gas. The amount of water is adjusted so as to maintain the temperature of the gas upon completion of the reaction below the desublimation point (snow point) of hexamethylenetetramine, that is 135° C., and above the dew point of water in order to prevent the desublimated hexamethylenetetramine from becoming moist.

Very surprisingly, in accordance with the invention anhydric, crystalline hexamethylenetetramine is obtained. The desublimation, i. e., transition directly from the gaseous into the solid state, of a water-soluble product by means of liquid water to form anhydric crystals was not known heretofore.

In carrying out the process of the invention a minor quantity of hexamethylenetetramine does not desublimate. This quantity may be recovered, along with excess ammonia, in the form of an aqueous solution by partial condensation of the exit gases. If this solution is added to the water to be introduced into the reaction zone practically theoretical yields of hexamethylenetetramine may be obtained.

In another embodiment of the invention the heat of reaction is abstracted by cooling the walls of the reactor or by introducing a cold inert gas into the reaction zone. This procedure results in a flaky, voluminous product having a very low specific weight.

The desublimated hexamethylenetetramine which collects at the bottom of the reactor may be hauled out of the reactor by any suitable conveying means—for instance by a screw conveyor or a swing arm.

The recrystallization of the hexamethylenetetramine formed at the walls of the reactor may be avoided by maintaining the temperature of the walls slightly below the dew point of the water vapor contained in the reaction gases. Thereby the walls are kept moist so that the hexamethylenetetramine coming into contact with the walls is dissolved. The solution of hexamethylenetetramine formed at the walls is collected in a channel and removed. If the dimensions of the reactor are appropriately chosen, only 5–10% of the hexamethylenetetramine produced are dissolved in the condensation water flowing from the walls.

The invention makes it possible to produce anhydric hexamethylenetetramine in a very economical way. Another advantage of the process in accordance with the invention is that hexamethylenetetramine is obtained in a nearly 100% yield.

The invention is further illustrated by the following typical exxample of a specific embodiment thereof.

*Example*

At the top of an insulated vertical reaction tower which is 700 millimetres in diameter, there are introduced through concentric inlet tubes 77 cubic metres per 1 hour (calculated at standard conditions) of a hot reaction gas having a temperature of about 100° C. and obtained by oxidation of aqueous methanol with air at a temperature of about 650° C. in the presence of a silver catalyst (composition of the gas: 18% by volume of formaldehyde, 43% by volume of water, and 39% by volume of inert gases); and 7.1 kilograms per 1 hour of gaseous ammonia. At the same time 5.5 kilograms per 1 hour of water and 15.25 kilograms per 1 hour of condensate obtained from the exit gases (containing 2.85 kilograms of hexamethylenetetramine and 0.9 kilogram of ammonia) are introduced through jets into the reaction zone.

After 27 hours 386.9 kilograms of hexamethylenetetramine are obtained, which corresponds to a yield of 99.4% of the theoretical. The heat required for producing the gaseous ammonia by evaporation of liquid ammonia is supplied by the exit gases.

Obviously, many modifications and variations of the invention, as hereinbefore set forth, may be made without departing from the spirit and scope thereof, and therefore only such limitations should be imposed as are indicated in the appended claims.

We claim:

1. Process for the production of hexamethylenetetramine, which comprises contacting gaseous formaldehyde with gaseous ammonia while maintaining the gaseous reaction mixture formed at a temperature between about the dew point of water and the desublimation temperature of hexamethylenetetramine by introducing cooling water in the form of a spray into the reaction mixture in amount to maintain said temperature and allow formation of hexamethylenetetramine in dry form, whereby the hexamethylenetetramine formed directly desublimates out of the reaction mixture in dry form, and recovering the dry hexamethylenetetramine thus formed.

2. Process according to claim 1, in which said gaseous formaldehyde is present in a vapor mixture obtained by the oxidation of methanol.

3. Process according to claim 1, in which said contacting is effected in a reaction container and which includes maintaining the walls of said reaction container at a temperature slightly below the dew point of the water vapor in the reaction gases.

4. Process according to claim 1, in which the reaction gases are maintained at a temperature between about 100 and 140° C. by the introduction of cooling water.

References Cited in the file of this patent

UNITED STATES PATENTS 2,293,619    Novotny _____ Aug. 18, 1942

FOREIGN PATENTS 509,296    Belgium _____ Mar. 15, 1952